(12) United States Patent
Eriksson

(10) Patent No.: US 11,981,330 B2
(45) Date of Patent: May 14, 2024

(54) METHOD FOR CONTROLLING A PLATOON OF VEHICLES

(71) Applicant: VOLVO TRUCK CORPORATION, Gothenburg (SE)

(72) Inventor: Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 184 days.

(21) Appl. No.: 17/288,292

(22) PCT Filed: Oct. 25, 2018

(86) PCT No.: PCT/EP2018/079340
§ 371 (c)(1),
(2) Date: Apr. 23, 2021

(87) PCT Pub. No.: WO2020/083499
PCT Pub. Date: Apr. 30, 2020

(65) Prior Publication Data
US 2021/0331674 A1   Oct. 28, 2021

(51) Int. Cl.
*B60W 30/14* (2006.01)
*B60W 30/165* (2020.01)
(Continued)

(52) U.S. Cl.
CPC ........ *B60W 30/146* (2013.01); *B60W 30/165* (2013.01); *B60W 40/076* (2013.01);
(Continued)

(58) Field of Classification Search
CPC ....................................................... G08G 1/22
See application file for complete search history.

(56) References Cited

U.S. PATENT DOCUMENTS

| 2013/0041576 A1 | 2/2013 | Switkes et al. |
| 2018/0143650 A1 | 5/2018 | Klaus et al. |

(Continued)

FOREIGN PATENT DOCUMENTS

| JP | 2013534655 A | 9/2013 |
| WO | 2013006826 A2 | 1/2013 |

(Continued)

OTHER PUBLICATIONS

International Search Report and Written Opinion dated Aug. 14, 2019 in corresponding International PCT Application No. PCT/EP2018/079340, 9 pages.

(Continued)

*Primary Examiner* — Imran K Mustafa
(74) *Attorney, Agent, or Firm* — Venable LLP; Jeffri A. Kaminski

(57) ABSTRACT

The invention relates to a method for controlling a platoon (10) of vehicles (1, X), wherein the platoon (10) comprises a leading vehicle (1) and at least one following vehicle (X) following the leading vehicle (1), wherein the leading and the following vehicle (1, X) at least to a certain extent are commonly controlled by a platoon control system (500) so as to drive at a common speed, wherein the method comprises the steps of: —transmitting data (200) from each vehicle (1, X) to the control system (500) comprising information on a current maximum engine torque output and a potential maximum torque output of respective vehicle (1, X); —identifying (300) which one of the lead and the at least one following vehicle (1, X) that limits an average speed (Va) of the platoon (10); and —increasing (400) the setting of the maximum engine torque output for the vehicle (1, X) identified to limit the average speed (Va) of the platoon (10).

13 Claims, 2 Drawing Sheets

(51) Int. Cl.
*B60W 40/076* (2012.01)
*G08G 1/00* (2006.01)
(52) U.S. Cl.
CPC ......... *G08G 1/22* (2013.01); *B60W 2300/125* (2013.01); *B60W 2510/0657* (2013.01); *B60W 2552/15* (2020.02); *B60W 2556/65* (2020.02)

(56) References Cited

U.S. PATENT DOCUMENTS

| | | | |
|---|---|---|---|
| 2018/0186381 A1 | 7/2018 | Erlien et al. | |
| 2019/0308624 A1* | 10/2019 | Borhan | B60W 30/165 |
| 2021/0163000 A1* | 6/2021 | Dieckmann | G01S 13/70 |

FOREIGN PATENT DOCUMENTS

| | | | |
|---|---|---|---|
| WO | 2015047175 A1 | 4/2015 | |
| WO | WO-2015047175 A1 * | 4/2015 | ............ B60W 30/16 |
| WO | 2017035516 A1 | 1/2017 | |

OTHER PUBLICATIONS

International Preliminary Report on Patentability dated Sep. 3, 2020 in corresponding International PCT Application No. PCT/EP2018/079340, 14 pages.

Office Action dated Sep. 30, 2023 in corresponding Chinese Application No. 2018-80098967.4, 11 pages.

* cited by examiner

METHOD FOR CONTROLLING A PLATOON OF VEHICLES

CROSS-REFERENCE TO RELATED APPLICATIONS

This application is a U.S. National Stage application of PCT/EP2018/079340, filed Oct. 25, 2018, and published on Apr. 30, 2020, as WO 2020/083499 A1, all of which is hereby incorporated by reference in its entirety.

TECHNICAL FIELD

The invention relates to a method for controlling a platoon of vehicles.

The invention can be applied in heavy-duty vehicles, such as trucks and buses. Although the invention will be described with respect to a truck, the invention is not restricted to this particular vehicle, but may also be used in other vehicles such as busses, cars and other road vehicles.

BACKGROUND

In recent year's significant progress have been made in the fields of autonomous and semi-autonomous vehicles. One segment of vehicle automation relates to vehicular convoying systems that enable vehicles to follow closely together in a safe, efficient and convenient manner. Following closely behind another vehicle has significant fuel savings benefits, but is generally unsafe when done manually by the driver. One type of vehicle convoying system is sometimes referred to as vehicle platooning systems or platoon, comprising a lead vehicle and one or several following vehicles autonomously or semi-autonomously controlled to closely follow the lead vehicle in a safe manner.

By controlling the following vehicle(s) to brake simultaneously with the leading vehicle, platooning can improve traffic safety. Platooning is also a cost-saver as the vehicles drive close together at a preferably constant speed, which means lower fuel consumption and less $CO_2$ emissions, due to less aerodynamic resistance for the following vehicles. Further, platooning efficiently boosts traffic flows thereby reducing traffic congestion, due to the short distance between vehicles, which also means less space taken up on the road by the same amount of vehicles.

US2018/0186381 discloses use of mass estimation calculation of a vehicle for organising vehicles in a platoon, especially for selecting the lead and the following vehicles in a platoon. As a general rule it is suggested that the vehicle with the highest mass takes the lead in the platoon due to e.g. a lower braking and acceleration capability. It is also discussed that other factors can influence the order of the vehicles in the platoon, such as vehicle engine power and brake maintenance. Physical ordering of the vehicles in a platoon can be complex and also take up a significant amount of time. There is therefore a need for improvements in how to organise a platoon of vehicles in order to optimise the performance of the platoon.

SUMMARY

An object of the invention is to provide a method for controlling a platoon of vehicles, which method optimises the performance of the platoon.

The object is achieved by a method according to claim 1 and relies on the utilisation of on-demand functionality of the vehicles, which enables an instant and real-time alteration of a vehicles performance capacity, such as maximum output torque, which in turn decreases the need for a specified physical order of the vehicles in the platoon.

According to a first aspect, the method for controlling a platoon of vehicles, wherein the platoon comprises a leading vehicle and at least one following vehicle following the leading vehicle, wherein the leading and the following vehicle at least to a certain extent are commonly controlled by a platoon control system so as to drive at a common speed, wherein the method comprises the step of;
 transmitting data from each vehicle to the control system comprising information on a setting of a current maximum engine torque output and a potential maximum torque output of respective vehicle;
 identifying which one of the lead and the at least one following vehicle that limits an average speed of the platoon; and
 increasing the setting of the maximum engine torque output for the vehicle identified to limit the average speed of the platoon.

The maximum output torque of a vehicle can be restricted due to different reasons. Normally, any vehicle engine output torque can be increased by software adjustments by e.g. increasing the amount of fuel provided to the engine in a given situation. The software controlling the engines is however designed to limit the engine output torque in order to keep the engine within its limits set to keep the whole driveline within its limits in regards to strain, load and wear, which are set to achieve a desired life time and service intervals of the vehicle, engine, driveline and associated components. However, temporary increases in the maximal torque can be allowed within defined limits with maintained life time and service intervals. There are several options for a vehicle manufacturer to define the limits. A single value of potential maximum engine torque output can be set, or a potential maximum engine torque output in combination with a time limitation on how long the potential maximum engine torque output is allowed to be used within a certain amount of hours and/or lifetime of the vehicle or other suitable restriction on the use of potential maximum torque can be set.

The method also includes vehicles designed with a software allowing a flexible torque output capacity defined by the owner/leaser of the vehicle upon demand. Higher torque and more power output in a vehicle leads to higher strain, load and wear on the vehicle in general and the vehicle driveline in particular, which increases the cost for owning the vehicle. Additionally, it is also common that insurance fees and taxes are related to the maximum engine power output of the vehicle, whereby there are good reasons to drive a vehicle with as low maximum engine power output as possible. Hence, a vehicle can be purchased/leased with lower output torque capacity than what is potentially available by the engine, whereby the maximum output power/torque can be released on demand, e.g. on request from a driver, a vehicle control or a platoon control. For example a fleet of leasing vehicles provided with one standard set up of vehicle hardware can be provided with different performance specification on demand, dependent on what a leaser/driver of the vehicle are prepared to pay. Increased performance can thereby be provided upon demand. In for example a truck it could be of additional interest to increase the maximum torque in for example a steep uphill in order to maintain a minimum speed or a minimum average speed.

In relation to the disclosed method the terms "current engine torque output", "current maximum engine torque output" and "potential maximum engine torque output" will be used. The current engine torque output of an engine of a vehicle is the output torque the engine currently is delivering. The current maximum engine torque output is the current maximum engine torque the engine can deliver if a vehicle control would require maximum torque. The potential maximum engine torque output is the potential maximum engine torque an engine could deliver if the engine limitations are altered. By changing the settings, a current maximum engine torque output can be increased up to a potential maximum engine torque output.

The present method can be applied independent of if the engine torque output is limited due to strain and life time requirements or due to application of a torque on-demand service, as long as the increase of torque output can be realised by a real-time implemented vehicle control adjustment. An exemplary effect of the method is that the engine torque output of individual vehicles can be used in order to achieve higher platoon speed, which all vehicles in the platoon take advantage of. The effect of the method can especially be utilised when driving in an ascent slope and/or during acceleration of a platoon after a stop or retardation caused by for example traffic congestion, road maintenance and/or accidents.

A platoon of vehicles comprises a leading vehicle and at least one following vehicle, and potentially a plurality of following vehicles. The leading vehicle drives first in the platoon and the following vehicles follow the leading vehicle. The leading and the following vehicles are commonly controlled by a platoon control system to at least a certain extent so as to allow controlling the vehicles to drive at a common speed. The goal of the common platoon control is to drive the vehicles in the platoon so close to each other that the following vehicle can utilise the lower air resistance which comes when driving close to a vehicle in front of the following vehicle.

The common speed is the instantaneous speed of the vehicles in the platoon, which is essentially equal for all the vehicles in the platoon, due to the common platoon control. The average speed is an average speed of the platoon over a certain time period or distance. The average speed of the platoon is also essentially equal for all the vehicles in the platoon, also due to the common platoon control and thereby common speed of the vehicles in the platoon. For a platoon having a constant common speed over a certain time period or distance, the average speed will be equal to the common speed of the platoon over that time period or distance. Hence, a desired increase of average speed is calculated over a specific time period or distance based on the instantaneous speed of the vehicles in the platoon.

Different implementations of platoon control as such are known and not part of this disclosure. A platoon control can vary from part/semi-autonomous to fully autonomous and the presented method would still be applicable.

To enable an at least partly common platoon control, vehicle data is transmitted between the vehicles of the platoon and the platoon control system so as to enable the common platoon control. The vehicle data is shared with at least a platoon control system. Typically, vehicle data is transmitted to the platoon control system from the individual vehicles and vehicle control data (instructions) are transmitted from the platoon control system to the individual vehicles. The transmission can be made in any suitable telematics gateway, such as cellular communication using 3G, 4G, 5G or any later developed communication standard. The platoon control can also use V2V (vehicle to vehicle) communication, V2X (vehicle to X) and/or a combination of communication with a common platoon control system and V2V and/or V2X communication.

In one exemplary embodiment of the method, it further comprises at least one of the following steps;
determining a gradeability of each vehicle in the platoon, wherein the gradeability is a function of at least a current maximum engine torque output,
determining whether the average speed of the platoon can be increased by increasing the engine torque output of the vehicle with the lowest gradeability,
evaluating whether it is possible to increase the engine torque output of the vehicle with the lowest gradeability coefficient.

One exemplary effect of connecting the possible torque increase to the gradeability of the vehicles is that the gradeability of the whole platoon can be increased by identifying the vehicle with the lowest gradeability. The average speed of the platoon during an ascent road stretch can thereby be increased. The method can be repeated until it is determined that the platoon can reach and/or keep a desired average speed. The desired average speed can be set dependent on desired arrival time to a certain destination and/or set to be limited by the maximum allowed speed for the road the platoon is travelling and/or the vehicles in the platoon.

Because the purpose of the method is to maintain as high average platoon speed as possible, the gradeability is preferably calculated for the highest gear of the vehicles. Gradeability can be defined in different ways, for the purpose of the disclosed method the gradeability is defined as the inclination the vehicle can climb on the highest gear of the vehicle, however the present method is not limited thereto and the gradeability can be calculated for a plurality of gears. However, for the purpose of one embodiment of the method, the gradeability is thereby the ability for a vehicle to climb an ascent road stretch with a specific inclination on the highest gear. The gradeability can be calculated through the equation:

$$Fc\max = F\text{hill} = m*g*\cos\alpha \tag{1}$$

Where Fcmax is the current maximum available force, Fhill is the force the vehicle needs to climb a hill, m is the mass of the vehicle, g is the gravity and α is the inclination of the road. As mass of the vehicle the total mass including any load is preferably used, this is sometimes called gross vehicle mass (GVM) or gross vehicle weight rating (GVWR).

The current maximum force is calculated according to the following equation;

$$F\text{cmax} = \frac{T*\eta*r}{Rr} \tag{2}$$

in which T is the maximum torque of the engine, η is the efficiency of the drive train, r is the total gear ratio of the drive train from engine to wheels and Rr is the rolling radius of the wheels. In one exemplary embodiment of the method the gradeability of each vehicle further is dependent on at least a rolling resistance of the respective vehicle.

In one exemplary embodiment of the method the gradeability of each vehicle further is dependent on at least an aerodynamic resistance of the respective vehicle.

By adding the rolling resistance and/or the aerodynamic resistance to the gradeability calculation a more accurate gradeability calculation can be achieved.

To calculate the gradeability in relation to the current maximum available power the following formula is used;

$$Fc\ max = Froll + Faero + Fhill \quad (3)$$

$$Froll = (m*g\ Cr) \quad (4)$$

$$Faero = (\rho*Cd*A*V^2)/2 \quad (5)$$

from which the inclination of the road α can be solved. If desired, the rolling resistance or the aerodynamic resistance can be set to zero, whereby the gradeability without influence of these can be calculated.

In the above equations Froll is the force the vehicle needs to overcome the rolling resistance, Faero is the force the vehicle needs to overcome the aerodynamic resistance, m is the mass of the vehicle, g is the gravity, Cr is the rolling resistance coefficient, p is the density of the air, Cd is the coefficient of drag, A is the projected area in square meters and V is the velocity in m/s.

The aerodynamic resistance is further dependent on the position of the vehicle in the platoon. In another exemplary embodiment, the aerodynamic resistance is dependent on both the position of the vehicle in the platoon and the distance between the vehicles in the platoon. By incorporate the position of the vehicle in the platoon and thereby the desired reduced aerodynamic resistance achieved by travelling in a platoon a more accurate gradeability calculation can be achieved. Additional accuracy is achieved by also incorporating the distance between the vehicles in the platoon. Hence, one or several of the method steps below can be comprised in the method in order to achieve a more accurate gradeability calculation.

In one exemplary embodiment the method step of determining a gradeability of each vehicle comprises at least the method step of;
determining a rolling resistance of each vehicle.

This method step would increase the precision of the gradeability calculation.

In one exemplary embodiment of the method, the method step of determining a gradeability of each vehicle further comprises the step of;
determining an aerodynamic resistance of each vehicle.

This method step would increase the precision of the gradeability calculation.

In one exemplary embodiment of the method, the method step of determining an aerodynamic resistance of each vehicle further comprises the method steps of;
determining a position of each vehicle in the platoon and reducing the aerodynamic resistance of each vehicle with a platoon reduction factor based on the position of the respective vehicle in the platoon.

In one exemplary embodiment of the method, the method step of determining an aerodynamic resistance of each vehicle further comprises the method steps of;
determining a distance between the vehicles in the platoon and
updating the platoon reduction factor based on the distance between the vehicle in the platoon.

In one exemplary embodiment of the method, the step of identifying which one of the lead and the at least one following vehicle that limits an average speed of the platoon is preceded by the step of;
determining that the platoon is in or is approaching an ascent road stretch and performing the proceeding steps provided that the platoon is positioned in or is approaching an ascent road stretch.

An effect of introducing the method step of detecting that the platoon is in or is approaching an ascent road stretch is that the rest of the method can be run only when there is a demand therefor and calculation power can thereby be saved. An ascent road stretch can with modern navigation systems be detected well in advance, whereby a longer road stretch can comprise several ascent road stretches. If it can be determined that the desired speed can be maintained over the steepest ascent inclination of the traveling route, the desired speed can be maintained over the less steep road stretches as well. The method can thereby be repeated when the previous determining horizon has been past or is about to be past by the platoon.

In one exemplary embodiment of the method, the step of identifying that the platoon is in or is approaching an ascent road stretch comprises at least one of the steps of;
registering a road inclination by an inclination sensor in at least one of the vehicles in the platoon, or
detecting an ascent by a navigation system and/or a map.

An exemplary effect of registering the road inclination by an inclination sensor is that the ascent of the road is detected with high accuracy and independent of a navigation system and map, i.e. the ascent road stretch can be detected even if there is a malfunction of the navigation system. In one exemplary embodiment a predetermined ratio of vehicles such as at least a half of the vehicles or a third of the vehicles of the platoon registering a road inclination by an inclination sensor. By increasing the ratio of vehicle needed for registering a ascent road stretch, a higher accuracy can be achieved. An exemplary effect of using the navigation system is that an ascent road stretch can be detected in advance. In one exemplary embodiment both at least one inclination sensor and a navigation system are used to detect and verify that the platoon is in or approaching an ascent road stretch.

The prediction of an upcoming drive route can be made in any available way in order to detect an ascent of the road. For example, by GPS (or similar global navigation satellite system (GNSS) such as GLOSNASS; BDS, Galileo) and/or cellular triangulation or similar, the position of the vehicle can be provided with a high accuracy. Additionally by positioning the vehicle location on a detailed map with road information, such as topography, curves of the road and traffic information, the imminent driving route and its effect on the vehicle can be estimated. The imminent driving route can be determined from e.g. a predetermined given route and/or a probability prediction based on historical vehicle and/or fleet information and/or road stretch and/or traffic information data. For the case of simplicity and explanation within this disclosure it is referred to a navigation system, wherein with a navigation system it is meant a device that has the capability to predict the imminent driving route, independently of the technology used for the prediction. The navigation system can be a local navigation system or a central navigation system, which the vehicle accesses remotely, e.g. through the platoon control system. The navigation system can communicate with the other control units of the vehicle.

As a result, vehicles equipped with a navigation system can include algorithms to analyse road topography, curvature and other relevant data collected by the navigation system, to generate a platoon control scheme taking these future driving conditions into account.

In one exemplary embodiment the vehicle data communicated to the platoon control system from the vehicles in the platoon comprises at least one of vehicle speed, vehicle position in the platoon, gear ratio of transmission, gear ratio of at least one drive axle, total vehicle mass and braking capacity.

In one exemplary embodiment, the data communicated to the vehicles from the platoon control system at least comprises; braking commands, acceleration commands, retardation commands and distance to vehicle ahead.

In one exemplary embodiment of the method the platoon control system is distributed in the vehicles of the platoon, provided in one designated vehicle of the platoon, such as the leading vehicle, or in a central system controlling the platoon from a distance. The method is not dependent on the location of the platoon control system.

One exemplary embodiment of the method foresees that one or a plurality of additional vehicles connects to the platoon, whereby if an additional vehicle connects to the platoon, the method is repeated.

One aspect of the disclosure concerns a computer program comprising program code means for performing the steps of the method when said program is run on a computer.

One aspect of the disclosure concerns a computer readable medium carrying a computer program comprising program code means for performing the steps of the method when said program product is run on a computer.

One aspect of the disclosure concerns a control unit for controlling a platoon of vehicles, wherein the control unit being configured to perform the steps of the method according to any of the method claims.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
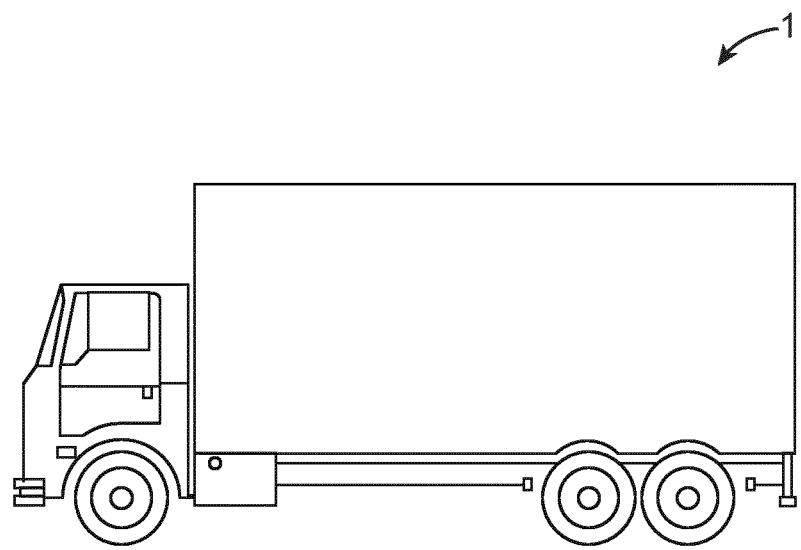
FIG. 1 is a schematic drawing of a truck.

The present invention will now be described more fully hereinafter with reference to the accompanying drawings, in which exemplary embodiments of the method are shown. The method may however be embodied in many different forms and should not be construed as limited to the embodiments set forth herein; rather, these embodiments are provided for thoroughness and completeness, and full convey the scope of the invention to the skilled addressee. Like reference characters refer to the like elements throughout the description.

Figure 2:
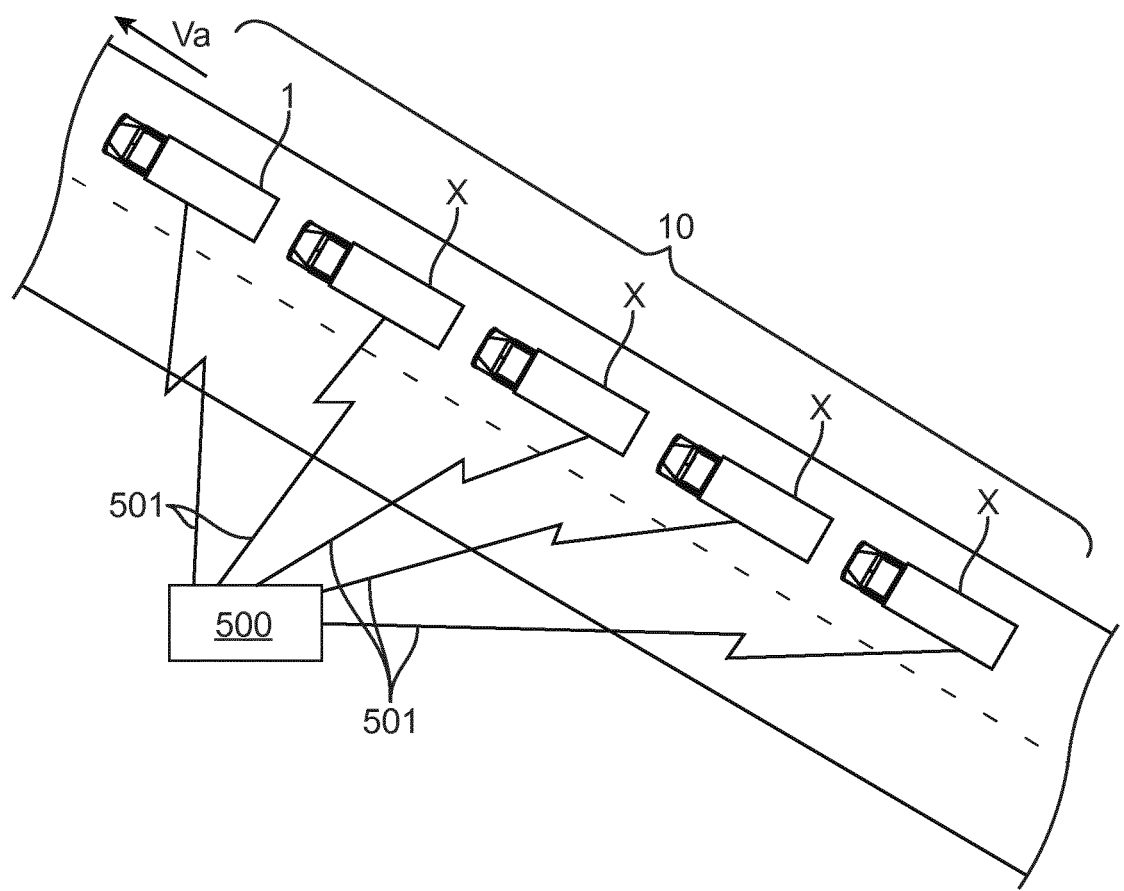
FIG. 2 is a schematic drawing of a platoon of trucks, and
FIG. 3a-b discloses flowcharts for embodiments of the disclosed method.

FIG. 1 discloses a truck 1 and FIG. 2 discloses a platoon 10 of trucks 1, X, which is suitable to control with the disclosed method. The platoon 10 comprises of a leading vehicle 1 and at least one following vehicle X, whereby in the disclosed platoon 10 four following vehicles X are disclosed, such that the whole platoon 10 comprises of five vehicles 1, X travelling in an average speed Va. The average speed Va is an average speed of the platoon 10 over a certain time period or distance. The average speed Va of the platoon 10 is also essentially equal for all the vehicles 1, X in the platoon 10, also due to the common platoon control and thereby common speed of the vehicles 1, X in the platoon 10. For a platoon 10 having a constant common speed over a certain time period or distance, the average speed Va will be equal to the common speed of the platoon 10 over that time period or distance. Hence, a desired increase of average speed Va is calculated over a specific time period or distance based on the instantaneous speed of the vehicles 1, X in the platoon 10.

It is to be understood that the method is not restricted to the number of vehicles in the platoon 10, as long as one leading vehicle 1 and at least one following vehicle X is present, the method can be implemented in a platoon with fewer or more vehicles 1, X than the disclosed five.

The platoon 10 is at least partly controlled by a common platoon control 500. In FIG. 2 the platoon control 500 is disclosed as a symbolic box. The platoon control 500 can be a central platoon control 500 or even be distributed among the vehicles 1, X, whichever is suitable.

Each vehicle 1, X in the platoon 10 are provided with a communication link 501 to the platoon control 500. The communication link 501 is any suitable telematics gateway enabling transmission of data for common control of at least some vehicle drive parameters, such as not limiting examples acceleration, retardation, speed and/or distance between the vehicles 1, X in the platoon 10.

Figure 3A:
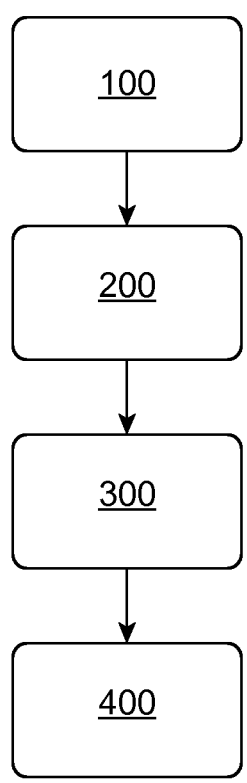

The flow chart in FIG. 3a discloses the basic function of the method. In method step 100 data is transmitted between the vehicles 1, X of the platoon 10 and the platoon control system 500 so as to enable the common platoon control. The method step 100 involves the basic platoon control, which enables the vehicles 1, X to travel in a platoon 10 with a short distance between the vehicles 1, X in order to save energy due to especially lower aerodynamic resistance for the following vehicles X. The method step 100 is continuously performed to uphold the common platoon control.

In method step 200 data is transmitted from each vehicle 1, X to the control system 500 comprising information about at least a current maximum engine torque output and a potential maximum engine torque output for respective vehicle 1, X.

In method step 300 the data transmitted in method step 200 is processed by the platoon control system 500 to identify which one of the lead and the at least one following vehicle 1, X that limits an average speed Va of the platoon. The average speed Va of the platoon is normally limited by the vehicle with the lowest weight to available engine torque ratio. By identifying the limiting vehicle 1, X an increase the average speed Va of the whole platoon 10 is enabled, due to the possibility to increase the limiting vehicles current maximum engine torque output.

In method step 400 the maximum engine torque output of the engine of the vehicle 1, X is increased up to the potential maximum engine torque output, whereby an average speed Va of the whole platoon can be increased. The method ends thereafter.

The advantages of the method are achieved in situations when there is a need for large torque, for example during acceleration of the platoon and during climbing an ascent road stretch.

To realise the method the common platoon control 500 should have the authority to at least temporary increase the maximum torque output of the engines of the vehicles 1, X of the platoon 10, or at least have the authority to command a vehicle control to do the same.

Figure 3B:
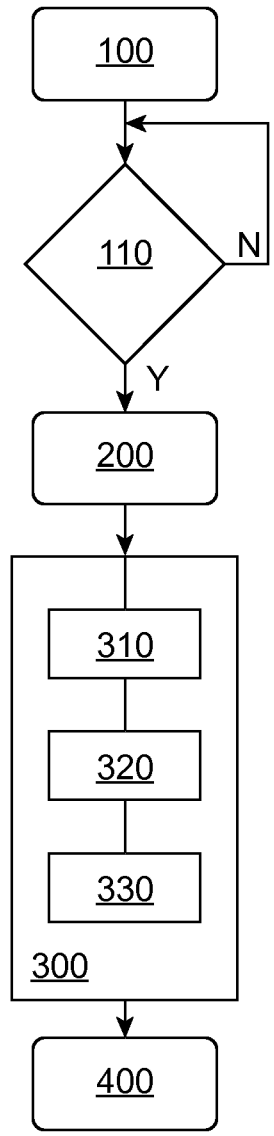

To enhance the method additional optional method steps are suggested in the flowchart disclosed in FIG. 3b.

In method step 110 a starting trigger for the method is searched for, whereby the method only continues to the next method step 200 if the starting trigger is detected.

Exemplary none-limiting starting triggers are;

starting of a platoon 10 driving mode, a detection of that the platoon 10 is in or is approaching an ascent road stretch, the end of a by the method previously regarded travelling route, a change in predicted travelling route, the connection of a new vehicle to the platoon 10 and/or an increase in desired platoon average speed Va.

By using a starting trigger for the method, calculation power can be saved, due that the method is only run when there is a demand therefore.

Now method step 300, which comprises identifying the vehicle 1, X that limits an average speed Va of the platoon 10, can include one or several sub-steps 310, 320, 330, which is illustrated in FIG. 3b. In method step 310 a gradeability of each vehicle 1, X in the platoon 10 is determined. The gradeability is defined as the road inclination a the vehicle can climb with maintained vehicle speed and is further dependent on at least a current maximum torque output.

In method step 320 it is determined whether the average speed Va of the platoon 10 can be increased by increasing the engine torque output of the vehicle or the vehicles 1, X with the lowest gradeability. I.e. it can be determined that several vehicles 1, X needs an increase in current maximum engine torque output in order to reach the desired average speed Va of the platoon 10 for the upcoming travelling route. In some cases, it might not be lack of torque resources that limits the average speed Va of the platoon, and instead be legislation such as speed limits, whereby an increase of the maximum engine torque output would not influence the average speed Va of the platoon 10.

When it is determined that an increase of the current maximum torque of one or several vehicles would increase the average speed Va of the platoon it is evaluated in method step 330 whether it is possible to increase the current maximum engine torque output of the vehicle(s) 1, X with the lowest gradeability. If it is possible to increase the torque this is done in method step 400.

The gradeability can be calculated with the previously disclosed equations (1), (2), (3), (4) and (5). Dependent of the degree of accuracy more or less input data can be used in the calculations. Preferably is however both aerodynamic and roll resistance used in the calculation of the gradeability.

It is to be understood that the present invention is not limited to the embodiments described above and illustrated in the drawings; rather, the skilled person will recognize that many changes and modifications may be made within the scope of the appended claims.

The invention claimed is:

1. A method for controlling a platoon of vehicles, wherein the platoon comprises a leading vehicle and at least one following vehicle following the leading vehicle, comprising:

commonly controlling the leading and the at least one following vehicle by a platoon control system so as to drive at a common speed;

transmitting data from each vehicle to the control system comprising information on a setting of a current maximum engine torque output and a potential maximum engine torque output of respective vehicle;

identifying which one of the leading and the at least one following vehicle, while driving at the common speed, limits an average speed of the platoon; and increasing the setting of the maximum engine torque output for the vehicle identified to limit the average speed of the platoon such that the vehicle identified to limit the average speed of the platoon does not vary from the common speed from the platoon control system.

2. Method according to claim 1, wherein the method further comprises one or several of the following steps; determining a gradeability of each vehicle in the platoon, wherein the gradeability is a function of at least a current maximum engine torque output, determining whether the average speed of the platoon can be increased by increasing the engine torque of the vehicle with the lowest gradeability, evaluating whether it is possible to increase the engine torque output of the vehicle with the lowest gradeability.

3. Method according to claim 2, wherein the method step of determining a gradeability of each vehicle comprises at least the method step of; determining a rolling resistance of each vehicle.

4. Method according to claim 2, wherein the method step of determining a gradeability of each vehicle further comprises the step of; determining an aerodynamic resistance of each vehicle.

5. Method according to claim 4, wherein the method step of determining an aerodynamic resistance of each vehicle further comprises the method steps of; determining a position of each vehicle in the platoon and reducing the aerodynamic resistance of each vehicle with a platoon reduction factor based on the position of the respective vehicle in the platoon.

6. Method according to claim 5, wherein the method step of determining an aerodynamic resistance of each vehicle further comprises the method steps of; determining a distance between the vehicles in the platoon and updating the platoon reduction factor based on the distance between the vehicle in the platoon.

7. Method according to claim 1, wherein the step of identifying which one of the leading and the at least one following vehicle limits an average speed of the platoon is preceded by the step of; determining whether the platoon is positioned in or is approaching an ascent road stretch and performing the proceeding steps provided that the platoon is positioned in or is approaching an ascent road stretch.

8. Method according to claim 7, wherein the step of identifying that the platoon is in or is approaching an ascent road stretch comprises at least one of the steps of; registering a road inclination by an inclination sensor arranged in at least one of the vehicles in the platoon, detecting an ascent by a navigation system and/or a map.

9. Method according to claim 1, wherein vehicle data transmitted from each vehicle to the platoon control system at least comprises; vehicle speed, vehicle, vehicle position in the platoon, gear ratio of transmission, gear ratio of at least one drive axle and total vehicle mass.

10. Method according to claim 1, wherein the platoon control system is distributed in the vehicles of the platoon, or is arranged in one designated vehicle of the platoon or is arranged in a central system controlling the platoon from a distance.

11. Method according to claim 1, wherein if an additional vehicle connects to and forms part of the platoon, the method is repeated.

12. A non-transitory computer readable medium carrying a computer program comprising program code for performing the steps of claim 1 when said program code is run on a computer.

13. A control unit for controlling a platoon of vehicles, wherein the control unit being configured to perform the steps of the method according to claim 1.

\* \* \* \* \*